(12) United States Patent
Shimada et al.

(10) Patent No.: US 9,403,519 B2
(45) Date of Patent: Aug. 2, 2016

(54) VEHICLE BRAKE SYSTEM

(71) Applicant: HONDA MOTOR CO., LTD., Minato-Ku, Tokyo (JP)

(72) Inventors: Takashi Shimada, Wako (JP); Soichiro Ueura, Wako (JP); Kazuharu Kidera, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/503,605

(22) Filed: Oct. 1, 2014

(65) Prior Publication Data

US 2015/0097415 A1 Apr. 9, 2015

(30) Foreign Application Priority Data

Oct. 4, 2013 (JP) ................. 2013-208706

(51) Int. Cl.
| | |
|---|---|
| *B60T 13/66* | (2006.01) |
| *B60T 13/74* | (2006.01) |
| *B60T 7/04* | (2006.01) |
| *B60T 8/24* | (2006.01) |
| *B60T 13/14* | (2006.01) |
| *B60T 8/40* | (2006.01) |

(52) U.S. Cl.
CPC ............. *B60T 13/745* (2013.01); *B60T 7/042* (2013.01); *B60T 8/245* (2013.01); *B60T 8/4081* (2013.01); *B60T 13/146* (2013.01); *B60T 13/66* (2013.01); *B60T 13/662* (2013.01)

(58) Field of Classification Search
CPC ........... B60T 7/042; B60T 7/122; B60T 8/17; B60T 8/245; B60T 13/66; B60T 13/662; B60T 13/745
USPC .................... 303/3, 10, 11, 20, 191
See application file for complete search history.

(56) References Cited

U.S. PATENT DOCUMENTS

| | | | | |
|---|---|---|---|---|
| 5,390,992 | A | * | 2/1995 | Walenty et al. ............... 303/112 |
| 6,199,670 | B1 | * | 3/2001 | Shirai et al. ..................... 303/20 |
| 6,604,795 | B2 | * | 8/2003 | Isono et al. .................... 303/11 |
| 2014/0200784 | A1 | * | 7/2014 | Nohira et al. .................. 701/70 |

FOREIGN PATENT DOCUMENTS

JP 2000-016279 A 1/2000

* cited by examiner

*Primary Examiner* — Thomas J Williams
(74) *Attorney, Agent, or Firm* — Carrier Blackman & Associates, P.C.; Joseph P. Carrier; Fulchand P. Shende

(57) ABSTRACT

The object of the present invention is to provide a vehicle brake system capable of appropriately setting an upper limit value of hydraulic pressure of a by-wire brake during stopping of a vehicle in accordance with conditions. When the vehicle is stopped, a maximum allowable drive voltage calculation unit sets a maximum allowable drive voltage to V2, and sets a brake pressure generated by a motor to P2. When the vehicle is stopped, if a duration time of stopping of the vehicle or a duration time of generation of the brake pressure exceeds a reference value, the maximum allowable drive voltage calculation unit sets the maximum allowable drive voltage to V3, and sets the brake pressure generated by the motor to P3 which is lower than P2.

5 Claims, 9 Drawing Sheets

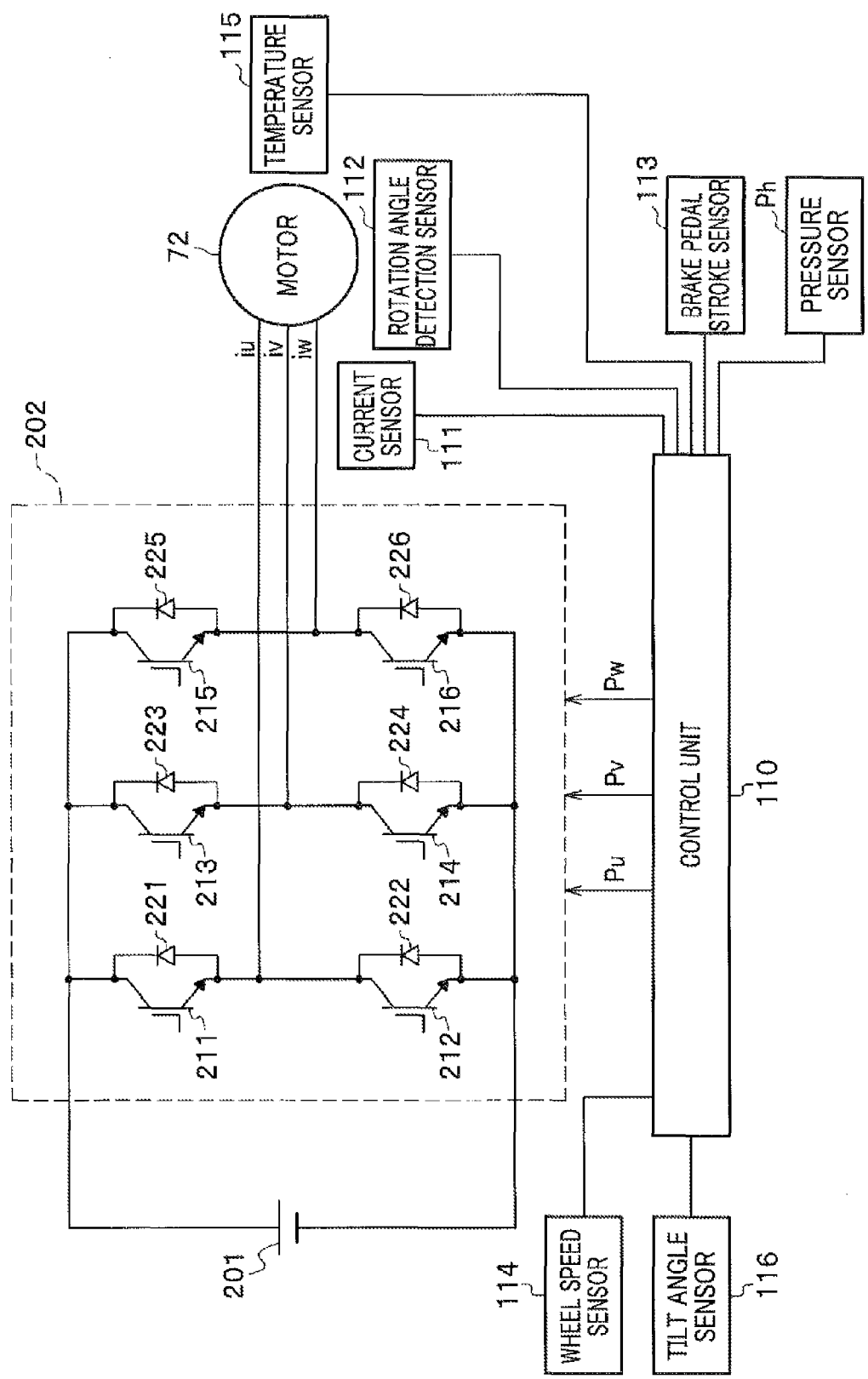

VEHICLE BRAKE SYSTEM

CROSS REFERENCE TO RELATED APPLICATIONS

This application claims the foreign priority benefit under Title 35, United States Code, 119 (a)-(d) of Japanese Patent Application No. 2013-208706 filed on Oct. 4, 2013 in the Japan Patent Office, the disclosure of which is herein incorporated by reference in its entirety.

TECHNICAL FIELD

The present invention relates to a vehicle brake system.

BACKGROUND ART

In a so-called by-wire brake that is used as a vehicle brake system, for example, there has been known to use a brushless motor as a servo motor for a driving source. In such a motor, when a high brake pressure is requested by driver's operation of a brake pedal such that a current supply more than a current capable of continuous energization of the motor is required, the motor becomes hot in some cases. To solve this problem, in Patent Document 1, there is disclosed a technology of reducing a current supplied to the motor for generating a braking force, when generation of the braking force has continued for a predetermined period of time or more.

CITATION LIST

Patent Literature

{Patent Document 1}
Japanese Patent Application Publication No. 2000-016279

SUMMARY OF INVENTION

Technical Problem

In order to prevent the motor from becoming hot, it is considered to set an upper limit value of hydraulic pressure (oil pressure) generated by the by-wire brake by restriction of the current supplied to the motor for driving the by-wire brake. And, the upper limit value of the hydraulic pressure is considered to be reduced during stopping of a vehicle in comparison with during running of the vehicle. That is, since inertial force that intends to continue stopping is applied to the vehicle during stopping of the vehicle, a large braking force is not required in comparison with during running of the vehicle, to which inertial force that intends to continue moving is applied. Therefore, from a viewpoint of preventing heat generation of the motor, it is desirable that the upper limit value of the hydraulic pressure of the by-wire brake is reduced in comparison with during running of the vehicle.

However, even during stopping of the vehicle, the hydraulic pressure required for the by-wire brake is not always the same. That is, since a relatively high braking force is required, for example, immediately before stopping of the vehicle, or immediately after stopping of the vehicle, it is necessary to increase to some extent the upper limit of the hydraulic pressure of the by-wire brake. However, when time has elapsed from a start of stopping of the vehicle, a large braking force is not required owing to a stable inertial force, and in this case, it is desirable to suppress heat generation of the motor by reducing the upper limit value of the hydraulic pressure in the by-wire brake.

Further, temperature conditions of the motor are various even during stopping of the vehicle, so it is desirable to suppress heat generation of the motor in accordance with the conditions. An object of the present invention is to provide a vehicle brake system capable of appropriately setting the upper limit value of the hydraulic pressure in the by-wire brake during stopping of the vehicle in accordance with the conditions.

Solution to Problem

One embodiment of the present invention is a vehicle brake system including a braking force generating unit that generates a braking force of a vehicle, an operation detection unit that detects an operation of a brake pedal, a hydraulic pressure generating unit that drives a motor to operate the braking force generating unit by a hydraulic pressure in response to a detection of the operation by the operation detection unit, a stop state determination unit that determines whether or not the vehicle is in a stop state, and a setting unit that sets an upper limit value of the hydraulic pressure generated by the hydraulic pressure generating unit to a first upper limit value if the stop state determination unit determines that the vehicle is in the stop state, and sets the upper limit value of the hydraulic pressure generated by the hydraulic pressure generating unit to a second upper limit value which is lower than the first upper limit value if a predetermined condition is established when the hydraulic pressure is the first upper limit value. According to the present invention, since the upper limit value of the hydraulic pressure is reduced when the predetermined condition is established, it is possible to appropriately set the upper limit value of the hydraulic pressure in the by-wire brake during stopping of the vehicle in accordance with the conditions.

Further, in the setting unit, the predetermined condition may be that a duration time of stopping of the vehicle or a braking time of the braking force generating unit by the hydraulic pressure generating unit is equal to or greater than a predetermined reference value. According to the present invention, since the upper limit value of the hydraulic pressure is reduced when the duration time of stopping or the braking time is long, it is possible to appropriately set the upper limit value of the hydraulic pressure in the by-wire brake during stopping of the vehicle in accordance with the conditions.

Further, the vehicle brake system may include a temperature determination unit that determines a temperature of the motor, wherein in the setting unit, the predetermined condition may be that the temperature of the motor which is determined by the temperature determination unit is equal to or higher than a predetermined reference value. According to the present invention, since the upper limit value of the hydraulic pressure is reduced when the temperature of the motor is high, it is possible to appropriately set the upper limit value of the hydraulic pressure in the by-wire brake during stopping of the vehicle in accordance with the conditions.

Further, in a case where the temperature of the motor which is determined by the temperature determination unit is equal to or higher than the predetermined reference value, when the stop state determination unit determines that the vehicle becomes in the stop state from a running state, the setting unit may set the upper limit value of the hydraulic pressure generated by the hydraulic pressure generating unit not to the first upper limit value but to the second upper limit value. According to the present invention, since the upper limit value of the hydraulic pressure is rapidly reduced when the temperature of the motor is high, it is possible to quickly set the upper limit value of the hydraulic pressure in the by-wire brake during stopping of the vehicle in accordance with the conditions.

Further, the vehicle brake system may include an inclination determination unit that determines an inclination of the vehicle, wherein in a case where the stop state determination unit determines that the vehicle is in the stop state, when the inclination determination unit determines that the vehicle is located on a slope which is inclined equal to or more than a predetermined gradient, the setting unit may increase at least one of the first upper limit value and the second upper limit value to be greater than when the inclination determination unit determines that the vehicle is located on a slope which is inclined less than the predetermined gradient. According to the present invention, since the upper limit value of the hydraulic pressure is rapidly reduced when the vehicle is stopped at a place where a gradient is small, it is possible to quickly set the upper limit value of the hydraulic pressure in the by-wire brake during stopping of the vehicle in accordance with the conditions.

Advantageous Effects of Invention

According to the present invention, it is possible to appropriately set the upper limit value of the hydraulic pressure in the by-wire brake during stopping of the vehicle in accordance with the conditions.

BRIEF DESCRIPTION OF DRAWINGS

FIG. 8 is a circuit diagram of a control system of a vehicle brake system according to an embodiment 2 of the present invention;

DESCRIPTION OF EMBODIMENTS

In the followings, a plurality of examples of an embodiment of the present invention will be described with reference to the accompanying drawings.

Embodiment 1

Figure 1:
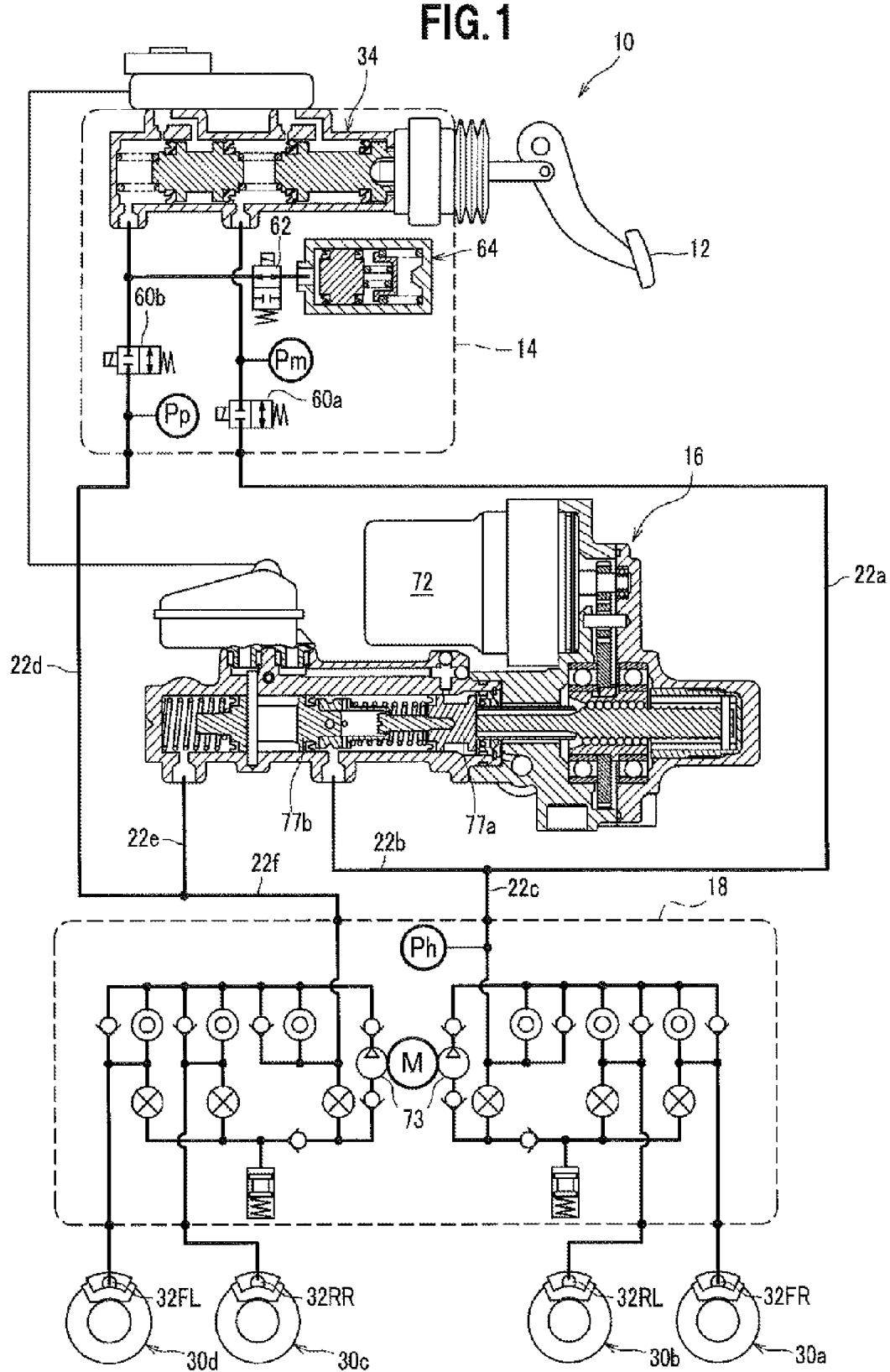
FIG. 1 is a configuration diagram showing an outline of a vehicle brake system according to an embodiment 1 of the present invention.

FIG. 1 is a configuration diagram showing an outline of a vehicle brake system 10 according to an embodiment 1 of the present invention. The vehicle brake system 10 is a device for generating friction braking force of a vehicle. The vehicle brake system 10 includes an input device 14 including a master cylinder 34 or the like for converting a depression force, which is inputted by a driver by an operation of a brake pedal 12, to a brake hydraulic pressure, a motor cylinder device 16 which is a hydraulic pressure generating unit for generating a brake hydraulic pressure in response to the brake hydraulic pressure generated in the master cylinder 34 or regardless of the brake hydraulic pressure, a vehicle behavior stabilization device (VSA device) 18, disc brake mechanisms 30a to 30d which are braking force generating units, and the like. The motor cylinder device 16 includes first and second slave pistons 77a, 77b for generating the brake hydraulic pressure in response to a driving force of an electric motor 72. Note that, piping tubes 22a to 22f are provided with brake hydraulic pressure sensors Pm, Pp, Ph for detecting the brake hydraulic pressure in each section. Further, the VSA 18 includes pumps 73 for pressurizing brake fluid.

To the motor cylinder device 16 (through the VSA device 18), a wheel cylinder 32FR for generating friction braking force by the hydraulic pressure in the disc brake mechanism 30a provided on a right front wheel of the vehicle (not shown), a wheel cylinder 32RL for generating friction braking force by the hydraulic pressure in the disc brake mechanism 30b provided on a left rear wheel (not shown), a wheel cylinder 32RR for generating friction braking force by the hydraulic pressure in the disc brake mechanism 30c provided on a right rear wheel (not shown), and a wheel cylinder 32FL for generating friction braking force by the hydraulic pressure in the disc brake mechanism 30d provided on a left front wheel (not shown) are connected.

Next, basic operations of the vehicle brake system 10 will be described. In the vehicle brake system 10, during normal operations of the motor cylinder device 16 and a control system (to be described below) for performing control of a by-wire, when the driver steps on the brake pedal 12, a so-called by-wire type brake system is activated. Specifically, in the vehicle brake system 10 during normal operation, when the driver steps on the brake pedal 12 (detected by a brake pedal stroke sensor 113 to be described below), in a state where a first shut-off valve 60a and a second shut-off valve 60b shut off communication between the master cylinder 34 and the disc brake mechanisms 30a to 30d (wheel cylinders 32FR, 32RL, 32RR, 32FL) for braking each wheel, the motor cylinder device 16 actuates the disc brake mechanisms 30a to 30d by using the brake hydraulic pressure generated by driving the motor 72, to brake each wheel.

Further, during normal operation, while the first shut-off valve 60a and the second shut-off valve 60b are shut off, a third shut-off valve 62 is opened, and the brake fluid flows into a stroke simulator 64 from the master cylinder 34, and even if the first shut-off valve 60a and the second shut-off valve 60b are shut off, the brake fluid moves to generate a stroke when the brake pedal 12 is operated, and pedal reaction force is generated.

On the other hand, in the vehicle brake system 10, during abnormal operation when the motor cylinder device 16 or the like is not operated, when the driver steps on the brake pedal 12, a conventional hydraulic type brake system is activated. Specifically, in the vehicle brake system 10 during abnormal operation, when the driver steps on the brake pedal 12, in a state where a first shut-off valve 60a and a second shut-off valve 60b are open and the third shut-off valve 62 is closed, the brake hydraulic pressure generated in the master cylinder 34 is transmitted to the disc brake mechanisms 30a to 30d (wheel cylinders 32FR, 32RL, 32RR, 32FL), so that the disc brake mechanisms 30a to 30d (wheel cylinders 32FR, 32RL, 32RR, 32FL) are actuated, to brake each wheel. Since structures and operations of other input device 14, the motor cylinder device 16, and the VSA device 18 are well known, detailed descriptions thereof will be omitted.

Figure 2:
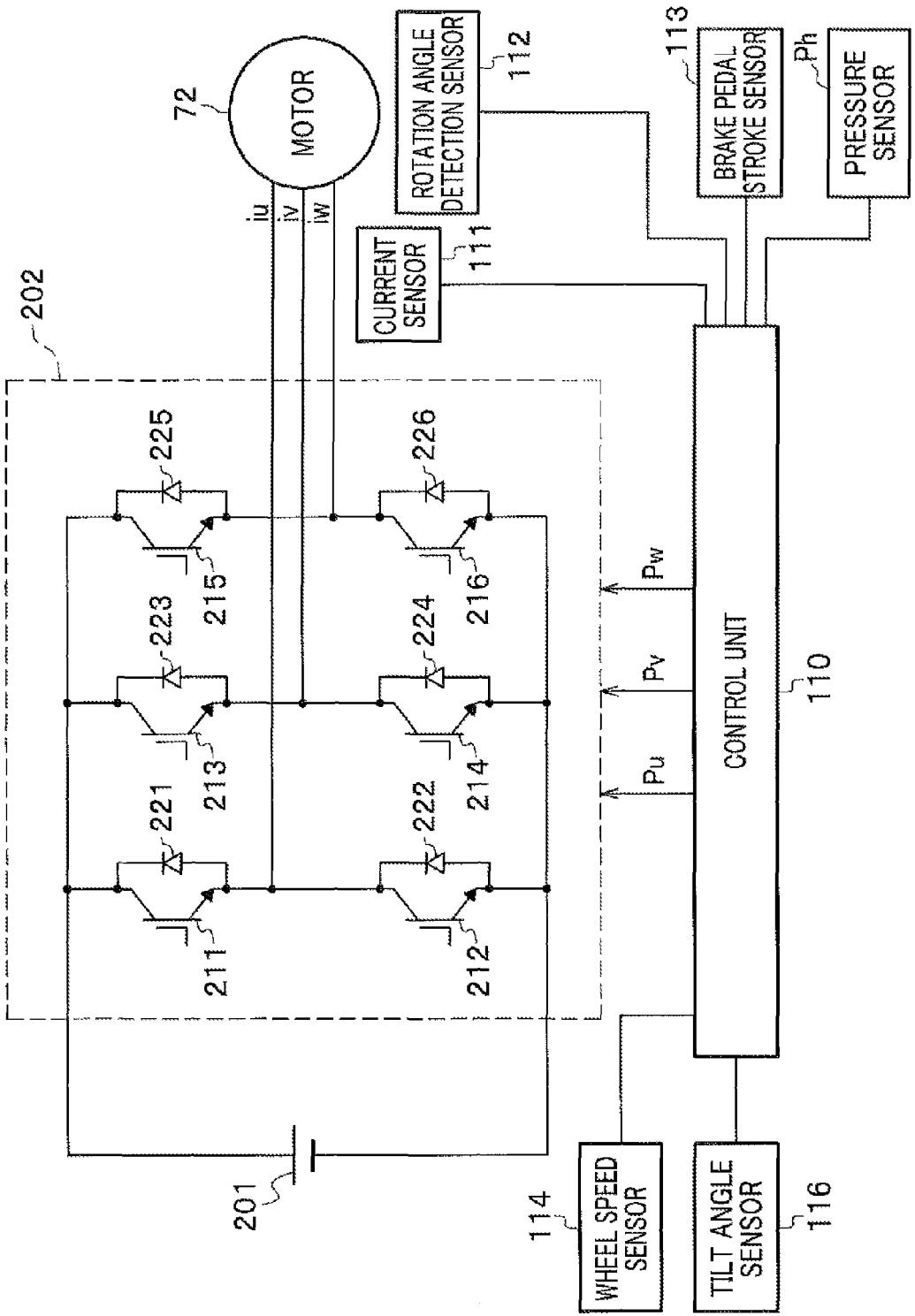
FIG. 2 is a circuit diagram of a control system of the vehicle brake system according to the embodiment 1 of the present invention.

FIG. 2 is a circuit diagram of the control system of the vehicle brake system 10. The motor 72 of the motor cylinder device 16 is, for example, composed of a brushless motor or the like. To the motor 72, an inverter 202, which converts DC power supplied from a battery 201 that is a DC power source to three-phase AC power, is connected. The inverter 202 is a circuit of known structure including six switching elements 211 to 216, and reflux diodes 221 to 226 each of which is connected in antiparallel with the corresponding one of these switching elements 211 to 216. That is, the inverter 202 is controlled by PWM (Pulse Width Modulation) signals Pu, Pv, Pw supplied from a control unit (an ECU: Electronic Control Unit) 110, and supplies drive currents iu, iv, iw to each phase of U-phase, V-phase, W-phase of the motor 72 by driving the switching elements 211 to 216 by a gate drive circuit (not shown) which is included in the inverter 202 on the basis of the PWM signals Pu, Pv, Pw, to rotationally drive the motor 72 in any direction and at any speed. Incidentally, if necessary, a converter for boosting a voltage of the battery 201 may be provided between the battery 201 and the inverter 202.

The control unit 110 is a unit for controlling the vehicle brake system 10, and has both functions of an ECU (a VSA-ECU) for controlling the VSA device 18 and an ECU (ESB-ECU) for controlling electric servo brake function etc. of the vehicle brake system 10. To the control unit 110, a current sensor 111 for detecting the drive currents iu, iv, iw which are supplied to each phase of the U-phase, V-phase, W-phase of the motor 72 from the inverter 202, and a rotation angle detection sensor 112 for detecting a rotation angle of the motor 72 are connected. Further, to the control unit 110, the pressure sensor Ph, a brake pedal stroke sensor 113 which is an operation detection unit for detecting an operation amount and an operation speed of the brake pedal 12, a wheel speed sensor 114 for detecting a wheel speed of each wheel of the vehicle, and a tilt angle sensor 116 for detecting a tilt angle of the vehicle are connected. The control unit 110 performs various controls for the motor 72 on the basis of various physical quantities detected by these various sensors. Incidentally, a sensorless control of the motor 72 without the rotation angle detection sensor 112 is also possible.

Figure 3:
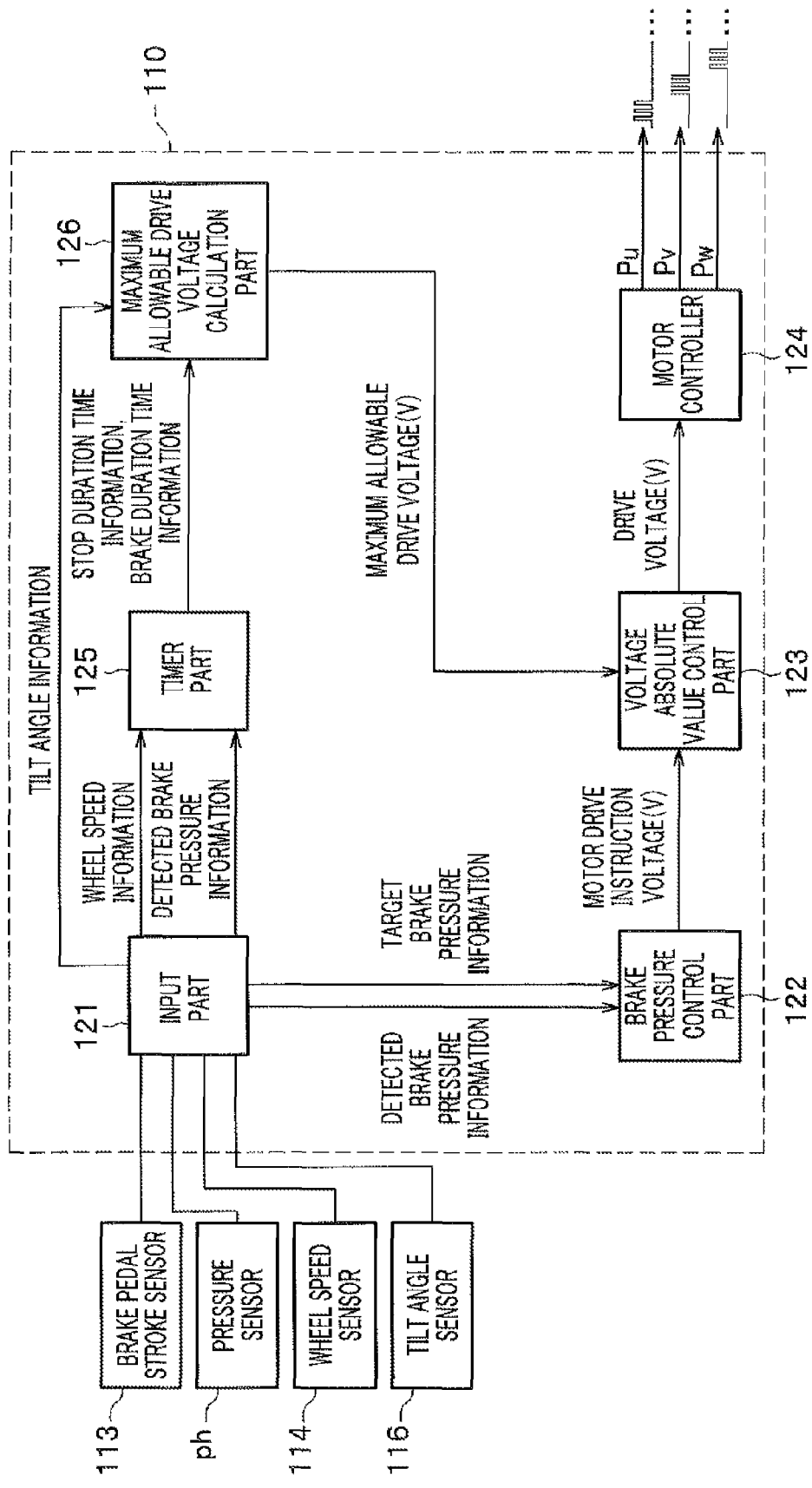
FIG. 3 is a block diagram for illustrating contents of control performed by a control unit of the vehicle brake system according to the embodiment 1 of the present invention.

FIG. 3 is a block diagram for illustrating contents of control performed by the control unit 110. An input part 121 receives inputs of detection values detected by the pressure sensor Ph, the brake pedal stroke sensor 113, the wheel speed sensor 114, and the tilt angle sensor 116. The input part 121 outputs "detected brake pressure information" which is a detection value of the pressure sensor Ph to a brake pressure control part 122. Further, the input part 121 determines a brake pressure (hydraulic pressure) to be outputted from the motor cylinder device 16 with use of the motor 72 on the basis of the operation amount and the operation speed of the brake pedal 12 detected by the brake pedal stroke sensor 113, and outputs the hydraulic pressure as "target brake pressure information" to the brake pressure control part 122.

The brake pressure control part 122 performs a feed-back control so that a brake pressure indicated by the detected brake pressure information which is inputted from the input part 121 becomes a brake pressure indicated by the target brake pressure information. That is, the brake pressure control part 122 generates a "motor drive instruction voltage" which is a signal instructing an output of the motor 72 so that the brake pressure indicated by the detected brake pressure information becomes the target brake pressure information, and outputs the "motor drive instruction voltage" to a voltage absolute value control part 123. On the basis of a value of a "maximum allowable drive voltage" (to be described below), the voltage absolute value control part 123 generates a "drive voltage" which is a voltage to be limited to a range where the motor drive instruction voltage does not exceed the maximum allowable drive voltage, and outputs the "drive voltage" to a motor controller 124.

The motor controller 124 generates the PWM signals Pu, Pv, Pw so that the output of the motor 72 is based on the drive voltage, and outputs them to the inverter 202. As described above, the brake pressure control part 122 generates the motor drive instruction voltage so that the brake pressure indicated by the detected brake pressure information becomes the brake pressure indicated by the target brake pressure information, while the voltage absolute value control part 123 generates the drive voltage by limiting the motor drive instruction voltage in a range not exceeding the maximum allowable drive voltage. Therefore, the motor 72 which is controlled based on the drive voltage can be controlled so that the output is below the brake pressure indicated by the target brake pressure information.

The input part 121 outputs "wheel speed information", which is information of rotational speeds of the wheels of the vehicle that are detected by the wheel speed sensor 114, to a timer part 125. Further, the input part 121 also outputs the "detected brake pressure information" detected by the pressure sensor Ph to the timer part 125. Furthermore, the input part 121 outputs "tilt angle information" indicating an inclination of the vehicle which is the detection value of the tilt angle sensor 116 to a maximum allowable drive voltage calculation unit 126 which is composed of a stop state determination unit, an inclination determination unit, and a setting unit.

The timer part 125 determines whether or not a wheel speed indicated by the wheel speed information is below a reference value s (the reference value s is a value close to zero). The timer part 125 determines that the vehicle is stopped when the wheel speed is below the reference value s. And, the timer part 125 counts a duration time of stopping of the vehicle. Further, the timer part 125 determines whether or not the hydraulic pressure (brake pressure) indicated by the detected brake pressure information exceeds a reference value p. When the brake pressure exceeds the reference value p, the timer part 125 determines that the brake pedal 12 is operated and the brake pressure is outputted by the motor cylinder device 16. And, the timer part 125 counts a duration time of output of the brake pressure. Then, the timer part 125 outputs "stop duration time information" as information of the duration time of stopping of the vehicle, and "brake duration time information" as information of the duration time of output of the brake pressure, to the maximum allowable drive voltage calculation unit 126. The maximum allowable drive voltage calculation unit 126 calculates a "maximum allowable drive voltage" on the basis of the stop duration time information, the brake duration time information, and the tilt angle information, and outputs this calculated maximum allowable drive voltage to the voltage absolute value control part 123.

Figure 4:
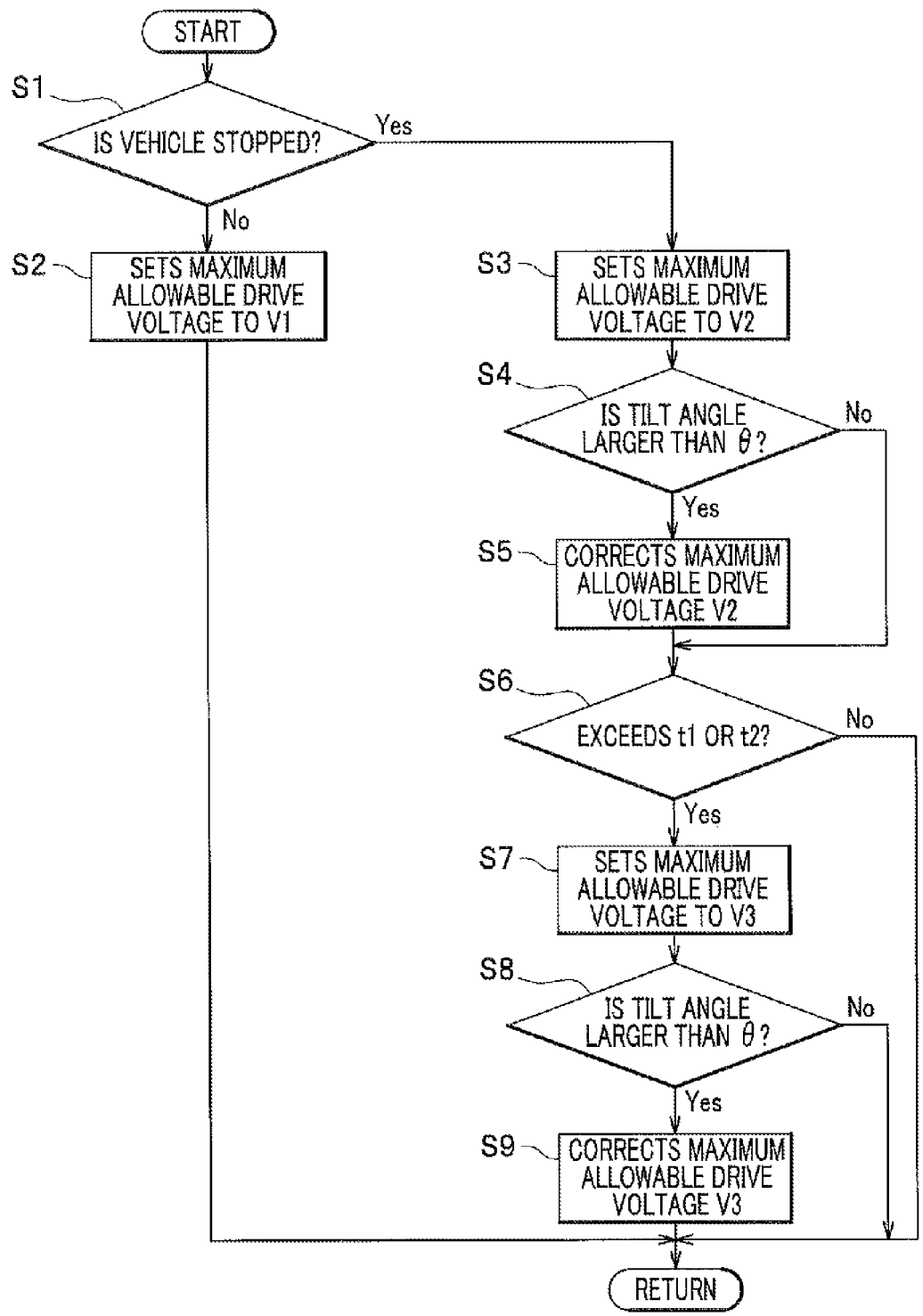
FIG. 4 is a flowchart of a process for calculating a maximum allowable drive voltage, the process being performed by a maximum allowable drive voltage calculation unit of the vehicle brake system according to the embodiment 1 of the present invention.

FIG. 4 is a flowchart of a process performed by the maximum allowable drive voltage calculation unit 126 for calculating a maximum allowable drive voltage. First, the maximum allowable drive voltage calculation unit 126 determines whether or not the vehicle is stopped on the basis of the stop duration time information (Step S1). That is, if the duration time of stopping of the vehicle is greater than zero, the maximum allowable drive voltage calculation unit 126 judges that the vehicle is stopped (Yes in Step S1). In Step S1, if the maximum allowable drive voltage calculation unit 126 judges that the vehicle is running (No in Step S1), it sets the maximum allowable drive voltage to V1 (Step S2). When the maximum allowable drive voltage is V1, the output of the motor 72 is limited so that an upper limit value of the brake pressure is P1. In this case, since the vehicle is running and a relatively large brake pressure may be required, an upper limit value P1 of the brake pressure is set to a relatively large value.

On the other hand, if the maximum allowable drive voltage calculation unit 126 judges that the vehicle is stopped (Yes in Step S1), it sets the maximum allowable drive voltage to V2 which is smaller than V1 (Step S3). When the maximum allowable drive voltage is V2, the motor 72 sets the upper limit value of the brake pressure to P2. In this case, since the vehicle is stopped and a large brake pressure is not required, the output of the motor 72 is limited so that the upper limit value of the brake pressure is P2 as a first upper limit value which is a value smaller than the upper limit value P1.

However, if a tilt angle of a place where the vehicle is stopped is large, there is a high possibility to require a larger brake pressure in order to stably keep stopping the vehicle, because the stop state is unstable. Therefore, if the tilt angle of the vehicle, which is indicated by the tilt angle information obtained from the input part 121, is larger than a reference angle θ (Yes in Step S4), the maximum allowable drive voltage calculation unit 126 corrects a maximum allowable drive voltage V2 so as to add a value α to an upper limit value P2 so that the upper limit value P2 is increased as the tilt angle is large (Step S5). The magnitude of the additional value α is increased as the tilt angle of the vehicle is large. However, even if the largest additional value α is added to the upper limit value P2, the upper limit value of the brake pressure does not exceed the upper limit value P1.

As described above, when the vehicle is stopped, in principle, the maximum allowable drive voltage is set to V2, and the upper limit value of the brake pressure is set to the upper limit value P2 which is a value smaller than the upper value P1. However, it is considered that a large brake pressure is not required in order to keep stopping the vehicle when a long time is elapsed from the vehicle has stopped. Further, when a long time has elapsed in a state of generating the brake pressure, it is desired that the output of the motor 72 is not increased, because braking performance is limited by heat generation due to brake operation during running after stopping of the vehicle if temperature of the motor 72 is raised.

Therefore, when the maximum allowable drive voltage is set to V2 (Step S3 including a case in which V2 is corrected in Step S5), the maximum allowable drive voltage calculation unit 126 determines whether or not a predetermined condition is satisfied on the basis of the stop duration time information and the brake duration time information. That is, in the present embodiment, the maximum allowable drive voltage calculation unit 126 determines whether or not the duration time of stopping of the vehicle exceeds a reference time t1 on the basis of the stop duration time information (Step S6). Or, the maximum allowable drive voltage calculation unit 126 determines whether or not the duration time of output of the brake pressure exceeds a reference time t2 on the basis of the brake duration time information (Step S6). When the duration time of stopping of the vehicle exceeds the reference time t1, or when the duration time of output of the brake pressure exceeds the reference time t2 (Yes in Step S6), the maximum allowable drive voltage calculation unit 126 sets the maximum allowable drive voltage to V3 (Step S7). When the maximum allowable drive voltage is V3, the output of the motor 72 is limited so that the upper limit value of the brake pressure is P3 which is smaller than P2. That is, in this case, the maximum allowable drive voltage calculation unit 126 limits the upper limit value of the brake pressure to P3 as a second upper limit value which is a value smaller than the upper limit value P2, so as to reduce the maximum allowable drive voltage to a voltage capable of long-term continuous energization by preventing reduction in braking performance due to excessive heat generation.

However, also in this case, if the tilt angle of the place where the vehicle is stopped is large, there is a high possibility to require a larger brake pressure in order to keep stopping the vehicle. Therefore, when the tilt angle of the vehicle, which is indicated by the tilt angle information obtained from the input part 121, is larger than the reference angle θ (Yes in Step S8), the maximum allowable drive voltage calculation unit 126 corrects a maximum allowable drive voltage V3 so as to add a value α to an upper limit value P3 so that the upper limit value P3 is increased as the tilt angle is large (Step S9). That is, the magnitude of the additional value α is increased as the tilt angle of the vehicle is large. Note that, the additional value α may be a constant value regardless of the tilt angle of the vehicle.

Figure 5A:
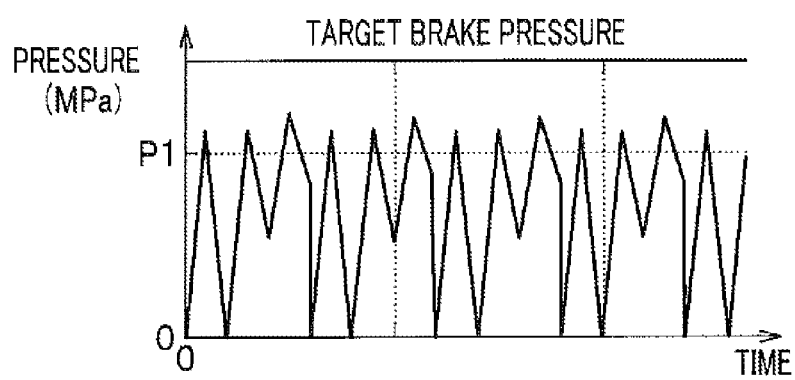
FIG. 5A is a graph for illustrating the process in FIG. 4 of the vehicle brake system according to the embodiment 1 of the present invention, and illustrating a target brake pressure.
Figure 5B:
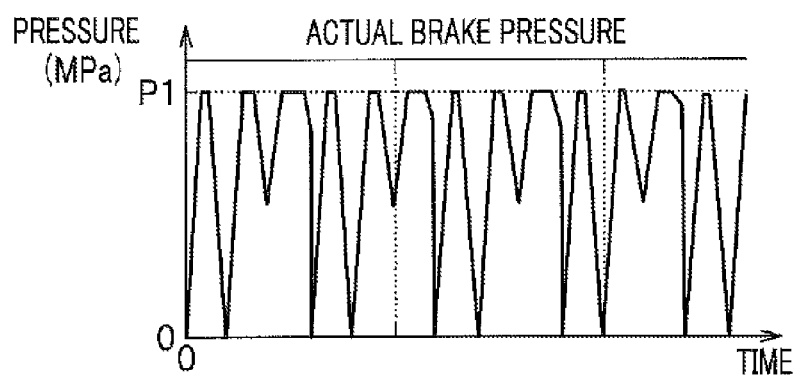
FIG. 5B is a graph for illustrating the process in FIG. 4 of the vehicle brake system according to the embodiment 1 of the present invention, and illustrating an actual brake pressure.
Figure 6A:
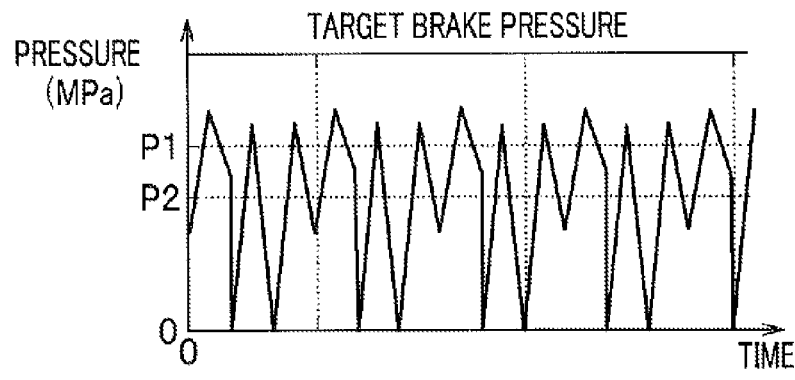
FIG. 6A is a graph for illustrating the process in FIG. 4 of the vehicle brake system according to the embodiment 1 of the present invention, and illustrating a target brake pressure.
Figure 6B:
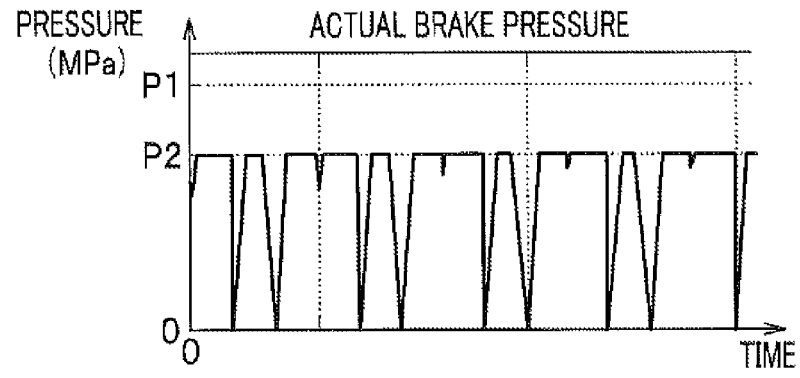
FIG. 6B is a graph for illustrating the process in FIG. 4 of the vehicle brake system according to the embodiment 1 of the present invention, and illustrating an actual brake pressure.
Figure 7A:
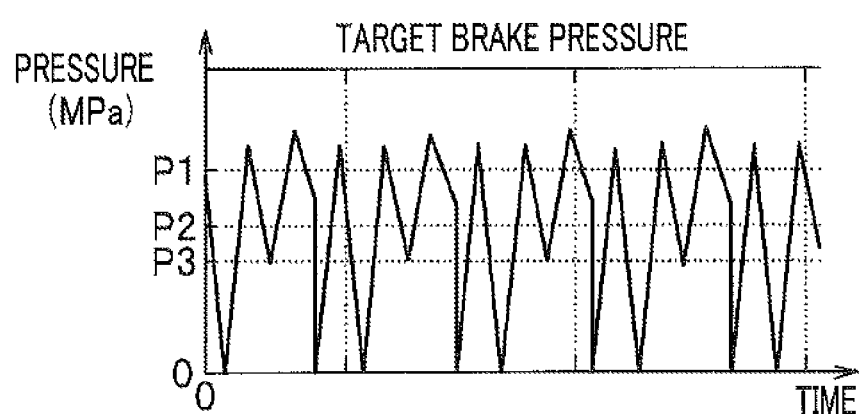
FIG. 7A is a graph for illustrating the process in FIG. 4 of the vehicle brake system according to the embodiment 1 of the present invention, and illustrating a target brake pressure.
Figure 7B:
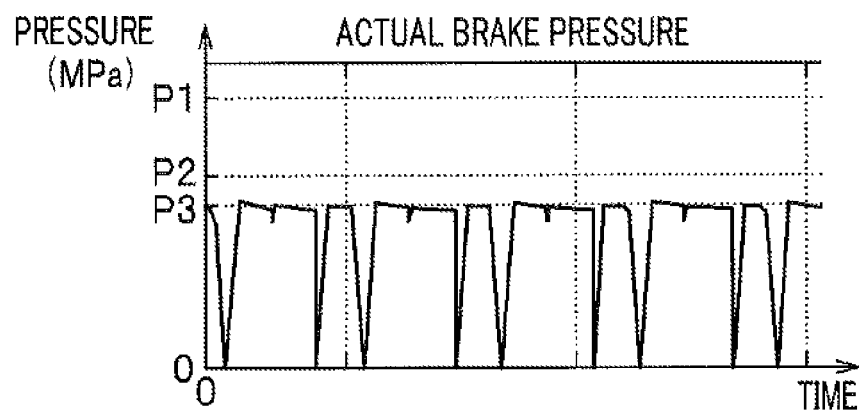
FIG. 7B is a graph for illustrating the process in FIG. 4 of the vehicle brake system according to the embodiment 1 of the present invention, and illustrating an actual brake pressure.

FIGS. 5A to 7B are graphs for illustrating the process in FIG. 4. Each of FIGS. 5A, 6A, 7A shows a target brake pressure indicated by target brake pressure information, that is, a time variation of the brake pressure requested by depressing the brake pedal 12 by the driver. Each of FIGS. 5B, 6B, 7B shows a brake pressure indicated by detected brake pressure information, that is, a time variation of the brake pressure (actual brake pressure) detected by the pressure sensor Ph. In FIGS. 5A to 7B, time variations in FIGS. 5A, 6A, 7A respectively correspond to those in FIGS. 5B, 6B, 7B in the up-down directions. All of FIGS. 5A to 7B show cases in which an operation of strongly depressing the brake pedal 12 and releasing the depression is continuously repeated. Note that, in any of FIGS. 5A to 7B, the additional value α is not considered.

FIGS. 5A, 5B show a case in which the maximum allowable drive voltage is set to V1 (Step S2). In this case, the actual brake pressure is limited to P1 as an upper limit as shown in FIG. 5B, even if the target brake pressure exceeds P1. FIGS. 6A, 6B show a case in which the maximum allowable drive voltage is set to V2 (Step S3). In this case, the actual brake pressure is limited to P2 as an upper limit which is lower than P1 as shown in FIG. 6B, even if the target brake pressure exceeds P1. FIGS. 7A, 7B show a case in which the maximum allowable drive voltage is set to V3 (Step S7). In this case, the actual brake pressure is limited to P3 as an upper limit which is lower than P1, P2 as shown in FIG. 7B, even if the target brake pressure exceeds P1.

According to the vehicle brake system 10 described above, it is possible to appropriately set the upper limit value of the hydraulic pressure (brake pressure) of the by-wire brake during stopping of the vehicle in accordance with the conditions. That is, when the vehicle has stopped, a temperature rise of the motor 72 is prevented by setting the upper limit value of the brake pressure to P2 which is lower than the upper limit value P1 of the brake pressure during running, by setting the maximum allowable drive voltage to V2 (Step S3). Further, even during stopping, when the duration time of stopping exceeds the reference time t1, or when the duration time of output of the brake pressure exceeds the reference time t2 (Yes in Step S6), a temperature rise of the motor 72 is prevented by setting the upper limit value of the brake pressure to P3 which is lower than P2, by setting the maximum allowable drive voltage to V3 (Step S7).

Further, when the tilt angle of the vehicle is larger than the reference angle θ (Yes in Step S4, Yes in Step S8), the upper limit values P2, P3 of the brake pressure during stopping are corrected by adding the additional value α, which is increased as the tilt angle of the vehicle is large, to the upper limit values P2, P3 (Steps S5, S9). In this manner, when the vehicle is stopped on a slope and a larger braking force is required, the upper limit value of the brake pressure can be greater than P2, P3.

Embodiment 2

Next, the vehicle brake system 10 according to an embodiment 2 of the present invention will be described. Since a configuration diagram of the vehicle brake system 10 of the present embodiment is the same as FIG. 1, and components thereof are the same as those described above with reference to FIG. 1, reference numerals same as the embodiment 1 are used, and detailed description thereof will be omitted.

FIG. 8 is a circuit diagram of a control system of a vehicle brake system 10 according to the embodiment 2. A configuration in FIG. 8 is different from that in FIG. 2 in that a temperature sensor 115, which is a temperature determination unit for detecting a temperature of the motor 72, is provided and this temperature sensor 115 is connected to the control unit 110. In other respects, each component shown in FIG. 8 is the same as the embodiment 1 which has been described with reference to FIG. 2, and detailed description thereof will be omitted.

Figure 9:
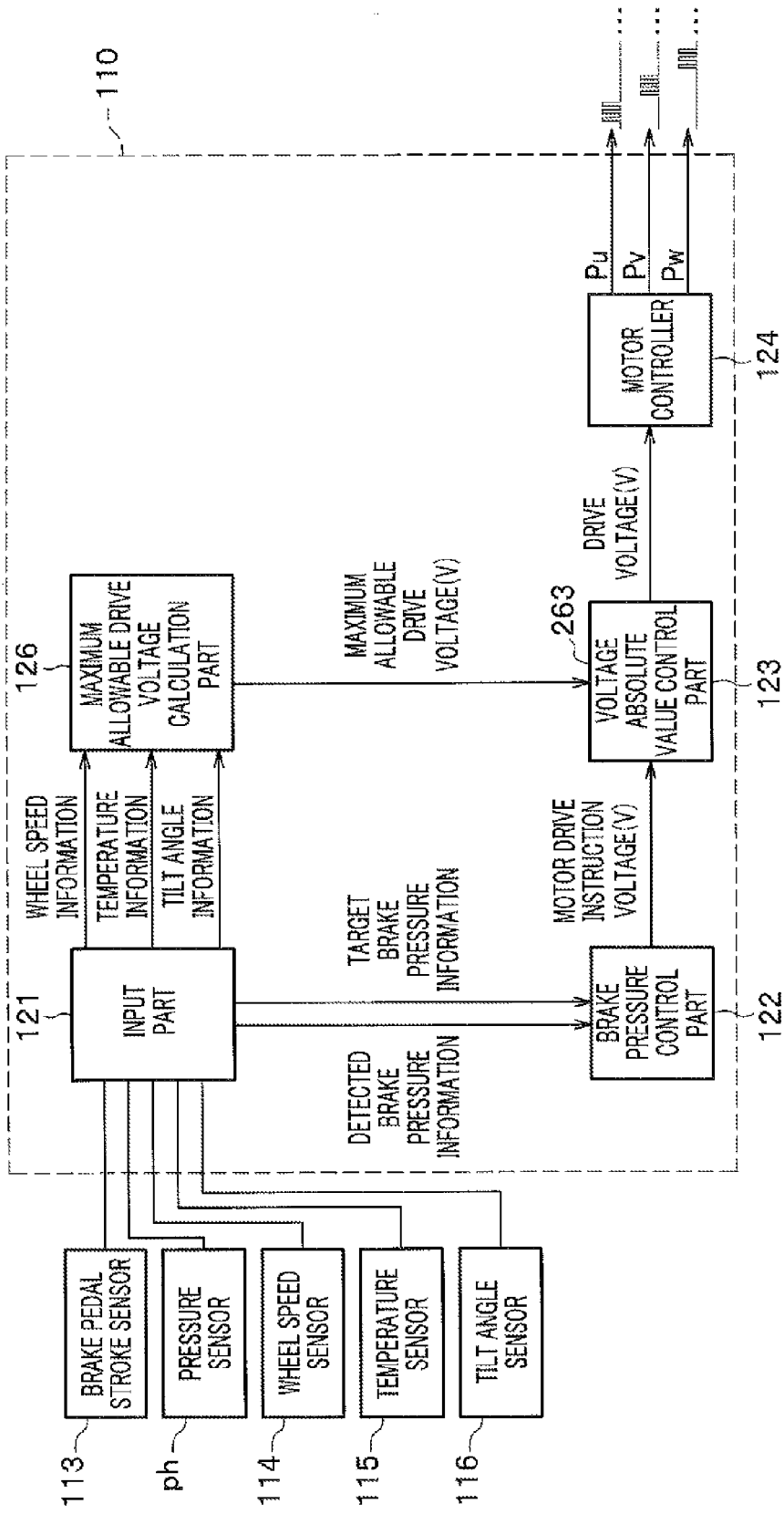
FIG. 9 is a block diagram for illustrating contents of control performed by a control unit of the vehicle brake system according to the embodiment 2 of the present invention.

FIG. 9 is a block diagram for illustrating contents of control performed by the control unit 110 of the vehicle brake system 10 according to the embodiment 2. First, a configuration in FIG. 9 is different from that in FIG. 3 in that a value detected by the temperature sensor 115 is inputted to the input part 121, and the timer part 125 is not provided. Further, to the maximum allowable drive voltage calculation unit 126, the vehicle speed information, the tilt angle information, and temperature information is inputted from the input part 121, instead of input of the stop duration time information and the brake duration time information from the timer part 125. The wheel speed information and the tilt angle information are the same as the embodiment 1. The "temperature information" is information of a detected temperature of the motor 27 detected by the temperature sensor 115. A process performed by the maximum allowable drive voltage calculation unit 126 is a process in FIG. 10 (to be described later) instead of the process in FIG. 4. In other respects, each component shown in FIG. 9 is the same as the embodiment 1 which has been described with reference to FIG. 3, and detailed description thereof will be omitted.

Figure 10:
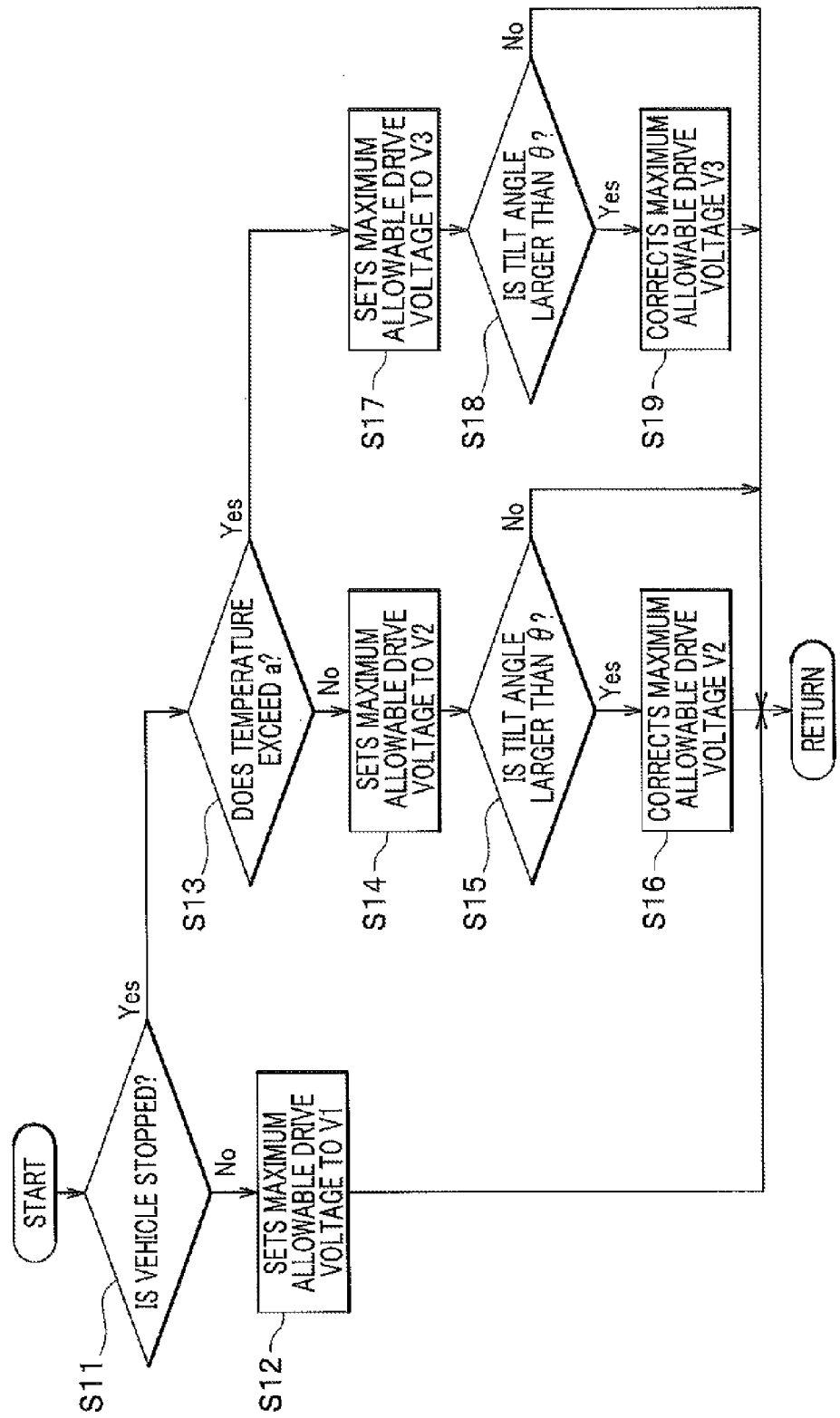
FIG. 10 is a flowchart of a process for determining a maximum allowable drive voltage, the process being performed by a maximum allowable drive voltage calculation unit of the vehicle brake system according to the embodiment 2 of the present invention.

FIG. 10 is a flowchart of the process performed by the maximum allowable drive voltage calculation unit 126 for determining the maximum allowable drive voltage. First, the maximum allowable drive voltage calculation unit 126 is composed of the stop state determination unit, the setting unit, and the inclination determination unit. The maximum allowable drive voltage calculation unit 126 determines whether or not the vehicle is stopped based on the wheel speed information (Step S11). In other words, the maximum allowable drive voltage calculation unit 126 determines whether or not the wheel speed is below a reference value s (the reference value s is a value close to zero). When the wheel speed is below the reference value s, it is judged that the vehicle is stopped (Yes in Step S11). In Step S11, if the maximum allowable drive voltage calculation unit 126 judges that the vehicle is running (No in Step S11), it sets the maximum allowable drive voltage to V1 (Step S12). When the maximum allowable drive voltage is V1, the output of the motor 72 is limited so that the upper limit value of the brake pressure is P1. In this case, since the vehicle is running and a relatively large brake pressure may be required, the upper limit value P1 of the brake pressure is set to a relatively large value.

On the other hand, if the maximum allowable drive voltage calculation unit 126 judges that the vehicle is stopped (Yes in Step S11), it determines whether or not a temperature, which is indicated by the temperature information of the motor 72 detected by the temperature sensor 115, exceeds a reference value a (Step S13). When the temperature is lower than or equal to the reference value a (No in Step S13), the maximum allowable drive voltage calculation unit 126 sets the maximum allowable drive voltage to V2 which is smaller than V1 (Step S14). When the maximum allowable drive voltage is V2, the output of the motor 72 is limited so that the upper limit value of the brake pressure is P2. In this case, since the vehicle is stopped and a large brake pressure is not required, the upper limit value of the brake pressure is set to P2 as a first upper limit value which is a value smaller than the upper limit value P1.

However, if the tilt angle of the place where the vehicle is stopped is large, there is a high possibility to require a larger brake pressure in order to keep stopping the vehicle. Therefore, if the tilt angle of the vehicle, which is indicated by the tilt angle information obtained from the input part 121, is larger than a reference angle θ (Yes in Step S15), the maximum allowable drive voltage calculation unit 126 corrects a maximum allowable drive voltage V2 so as to add a value α to an upper limit value P2 so that the upper limit value P2 is increased as the tilt angle is large (Step S16). In other words, the magnitude of this additional value α is increased as the tilt angle of the vehicle is large. However, even if the largest additional value α is added to the upper limit value P2, the upper limit value of the brake pressure does not exceed P1. Note that, the additional value α may be a constant value as described above.

On the other hand, when the temperature of the motor 72 is high, it is desired that the temperature rise is prevented by limiting the output of the motor 72. Therefore, when the temperature of the motor 72 exceeds the reference value a (Yes in Step S13), the maximum allowable drive voltage calculation unit 126 sets the maximum allowable drive voltage to V3 (Step S17). When the maximum allowable drive voltage is V3, the motor 72 sets the upper limit value of the brake pressure to P3. In this case, in order to suppress excessive heat generation, an upper limit value P3 of the brake pressure is set as a second upper limit value which is smaller than the upper limit value P2.

However, also in this case, if the tilt angle of the place where the vehicle is stopped is large, there is a high possibility to require a larger brake pressure in order to keep stopping the vehicle. Therefore, when the tilt angle of the vehicle, which is indicated by the tilt angle information obtained from the input part 121, is larger than the reference angle θ (Yes in Step S18), the maximum allowable drive voltage calculation unit 126 corrects a maximum allowable drive voltage V3 so as to add a value α to an upper limit value P3 so that the upper limit value P3 is increased as the tilt angle is large (Step S19). That is, the magnitude of the additional value α is increased as the tilt angle of the vehicle is large. Note that, the additional value α may be the constant value as described above. Also in the present embodiment, the upper limit values P1, P2, and P3 are respectively controlled similarly to cases of FIGS. 5A, 5B, FIGS. 6A, 6B, and FIGS. 7A, 7B of the embodiment 1.

According to the vehicle brake system 10 described above, it is possible to appropriately set the upper limit value of the hydraulic pressure (brake pressure) of the by-wire brake during stopping of the vehicle in accordance with the conditions. That is, when the vehicle has stopped, since a large braking force is not required, a temperature rise of the motor 72 is prevented by setting the upper limit value P2 which is lower than the upper limit value P1 of the brake pressure during running. Further, in this case, when the temperature of the motor 72 is high, the temperature rise of the motor 72 is prevented by setting the upper limit value of the brake pressure to the upper limit value P3 which is lower than P2.

In this case, in the embodiment 1 described above, when the vehicle has stopped, the upper limit value of the brake pressure is once set to P2 and then set to P3 (see FIG. 4), however, in the present embodiment, if the temperature of the motor 72 is high (Yes in Step S13), the upper limit value of the brake pressure is not set to P2 but directly set to P3 (Step S17), and thus it is possible to quickly suppress the temperature rise of the motor 72 or to reduce the temperature.

Further, when the tilt angle of the vehicle is larger than the reference angle θ (Yes in Step S15, Yes in Step S18), the upper limit values P2, P3 of the brake pressure during stopping are corrected by adding the additional value α, which is increased as the tilt angle of the vehicle is large, to the upper limit values P2, P3 (Steps S16, S19). In this manner, when the vehicle is stopped on a slope and a larger braking force is required, the upper limit value of the brake pressure can be greater than P2, P3.

Note that, in the present embodiment, in order to determine the temperature of the motor 72, the temperature of the motor 72 is directly detected by the temperature sensor 115, however, this may be obtained by calculation or the like. Specifically, the temperature of the motor 72 may be estimated by calculation or the like based on various conditions such as an ambient temperature, a magnitude of the output of the motor 72, an elapsed time from the last end of the drive, and a drive duration time of the motor 72, or may be calculated based on a heat release amount or a heat generation amount of the motor 72. Further, in the embodiments 1, 2, a correction by adding the value α is subjected to both the maximum allowable drive voltage V2 and the maximum allowable drive voltage V3 (Steps S5, S9, S16, S19), however, it may be subjected to only one of them. Further, a switching of the upper limit value of the brake pressure may be performed gradually. In this case, an uncomfortable feeling to the driver can be reduced. Furthermore, the switching of the upper limit value of the brake pressure may be performed by changing a target value in accordance with a time-based control map.

REFERENCE SIGNS LIST

10: vehicle brake system
12: brake pedal
16: motor cylinder device (hydraulic pressure generating unit)
30a to 30d: disc brake mechanism (braking force generating unit)
72: motor
110: control unit (setting unit)
113: brake pedal stroke sensor (operation detection unit)
114: wheel speed sensor
115: temperature sensor (temperature determination unit)
116: tilt angle sensor
126: maximum allowable drive voltage calculation unit (stop state determination unit, setting unit, inclination determination unit)
Ph: pressure sensor

The invention claimed is:

1. A vehicle brake system comprising:
a braking force generating unit that generates a braking force of a vehicle;
an operation detection unit that detects an operation of a brake pedal;
a hydraulic pressure generating unit that drives a motor to operate the braking force generating unit by a hydraulic pressure in response to a detection of the operation by the operation detection unit;
a stop state determination unit that determines whether or not the vehicle is in a stop state; and
a setting unit that sets an upper limit value of the hydraulic pressure generated by the hydraulic pressure generating unit to a first upper limit value in a case where the stop state determination unit determines that the vehicle is in the stop state, and sets the upper limit value of the hydraulic pressure generated by the hydraulic pressure generating unit to a second upper limit value which is always lower than the first upper limit value in a case where a predetermined condition is established when the hydraulic pressure is the first upper limit value.

2. The vehicle brake system according to claim 1, wherein in the setting unit, the predetermined condition is one of that a duration time of stopping of the vehicle and a braking time of the braking force generating unit by the hydraulic pressure generating unit is equal to or greater than a predetermined reference value.

3. The vehicle brake system according to claim 1, further comprising a temperature determination unit that determines a temperature of the motor,
wherein in the setting unit, the predetermined condition is that the temperature of the motor which is determined by the temperature determination unit is equal to or higher than a predetermined reference value.

4. The vehicle brake system according to claim 1, further comprising an inclination determination unit that determines an inclination of the vehicle,
wherein in a case where the stop state determination unit determines that the vehicle is in the stop state, when the inclination determination unit determines that the vehicle is located on a slope which is inclined equal to or more than a predetermined gradient, the setting unit increases at least one of the first upper limit value and the second upper limit value to be greater than when the inclination determination unit determines that the vehicle is located on a slope which is inclined less than the predetermined gradient.

5. A vehicle brake system comprising:
a braking force generating unit that generates a braking force of a vehicle;
an operation detection unit that detects an operation of a brake pedal;
a hydraulic pressure generating unit that drives a motor to operate the braking force generating unit by a hydraulic pressure in response to a detection of the operation by the operation detection unit;
a stop state determination unit that determines whether or not the vehicle is in a stop state;
a setting unit that sets an upper limit value of the hydraulic pressure generated by the hydraulic pressure generating unit to a first upper limit value in a case where the stop state determination unit determines that the vehicle is in the stop state, and sets the upper limit value of the hydraulic pressure generated by the hydraulic pressure generating unit to a second upper limit value which is lower than the first upper limit value in a case where a predetermined condition is established when the hydraulic pressure is the first upper limit value; and
a temperature determination unit that determines a temperature of the motor,
wherein in the setting unit, the predetermined condition is that the temperature of the motor which is determined by the temperature determination unit is equal to or higher than a predetermined reference value; and
wherein in a case where the temperature of the motor which is determined by the temperature determination unit is equal to or higher than the predetermined reference value, when the stop state determination unit determines that the vehicle becomes in the stop state from a running state, the setting unit sets the upper limit value of the hydraulic pressure generated by the hydraulic pressure generating unit not to the first upper limit value but to the second upper limit value.

* * * * *